United States Patent [19]

Ezure et al.

[11] Patent Number: 5,042,781
[45] Date of Patent: Aug. 27, 1991

[54] ACCUMULATOR

[75] Inventors: Nobuya Ezure; Ichiro Takadera; Kohei Taguchi, all of Yokohama, Japan

[73] Assignee: NHK Spring Co., Ltd., Yokohama, Japan

[21] Appl. No.: 375,340

[22] Filed: Jun. 30, 1989

Related U.S. Application Data

[63] Continuation-in-part of Ser. No. 253,887, Oct. 6, 1988, Pat. No. 4,890,822, which is a continuation-in-part of Ser. No. 10,336, Feb. 3, 1987, abandoned.

[30] Foreign Application Priority Data

Feb. 13, 1986 [JP] Japan .................................. 61-18184
Sep. 19, 1986 [JP] Japan ................................ 61-221348

[51] Int. Cl.⁵ .......................... F16F 9/04; F16F 5/00
[52] U.S. Cl. ................................ 267/64.23; 267/64.26
[58] Field of Search ............... 267/64.13, 64.19, 64.16, 267/64.23, 64.26, 64.28, 122, 218; 188/298, 269; 92/43, 47, 48; 251/61.2; 280/708

[56] References Cited

U.S. PATENT DOCUMENTS

| | | |
|---|---|---|
| 2,186,183 | 1/1940 | Trumbull . |
| 2,867,241 | 1/1959 | Harris . |
| 2,948,223 | 8/1960 | Mashinter . |
| 3,321,200 | 5/1967 | Polhemus et al. . |
| 3,397,621 | 8/1968 | Groves ..................... 92/48 |
| 3,469,661 | 9/1969 | Hoffmann et al. . |
| 3,587,789 | 6/1971 | Keuholz et al. ............. 188/269 |
| 3,955,807 | 5/1976 | Takahashi et al. ........... 267/64.23 |
| 4,219,190 | 8/1980 | Nagase ........................ 267/64.28 |
| 4,241,816 | 12/1980 | Hubrecht et al. ............ 188/298 |
| 4,311,302 | 1/1982 | Heyer et al. .................. 267/64.23 |
| 4,614,255 | 9/1986 | Morita et al. . |
| 4,720,085 | 1/1988 | Shinbori et al. ............. 267/64.16 |
| 4,746,106 | 5/1988 | Fukumura .................... 267/218 |
| 4,813,519 | 3/1989 | Matsubara et al. .......... 267/64.15 |
| 4,828,231 | 5/1988 | Fukumura et al. .......... 267/64.23 |
| 4,830,398 | 5/1989 | Williams et al. ............. 267/64.26 |
| 4,880,213 | 11/1989 | Shinbori et al. ............. 267/64.27 |

FOREIGN PATENT DOCUMENTS

| | | |
|---|---|---|
| 1122780 | 1/1962 | Fed. Rep. of Germany ... 267/64.26 |
| 2936366 | 3/1981 | Fed. Rep. of Germany . |
| 1512209 | 2/1968 | France . |
| 2503055 | 10/1982 | France . |
| 996768 | 2/1983 | U.S.S.R. . |

Primary Examiner—Robert J. Oberleitner
Attorney, Agent, or Firm—Frishauf, Holtz, Goodman & Woodward

[57] ABSTRACT

An acculumator having a housing and bellows located within the housing and partitioning the housing into an oil chamber and a gas chamber. A stopper is provided in the housing. The stopper has an oil passage port opposing the free end of the bellows. The free end of the bellows has a self-sealing member which opposes the oil passage port of the stopper. The self-sealing member is made of elastomer. When gas is charged into the gas chamber, the bellows expand, causing the self-sealing member to fit into the oil passage port. As a result of this, back-up oil is confined in the back-up oil chamber defined between the outer periphery of the bellows and the inner periphery of the housing. Hence, the back-up oil supports the bellows as long as the gas is being charged into the gas chamber.

1 Claim, 5 Drawing Sheets

ACCUMULATOR

CROSS-REFERENCE TO THE RELATED APPLICATIONS

This is a continuation-in-part of application Ser. No. 253,887 filed on Oct. 6, 1988, (now U.S. Pat. No. 4,890,822 issued Jan. 2, 1990), which in turn is a continuation-in-part of application Ser. No. 010,336, filed Feb. 3, 1987, and now abandoned.

BACKGROUND OF THE INVENTION

1. Field of the Invention

The present invention relates to an accumulator for vehicles, and more specifically, to an improvement in an accumulator having an oil chamber, a gas chamber, and metal bellows therein.

2. Description of the Related Art

Prior art accumulators for motor vehicles, which are adapted to contain oil and compressed gas, comprise a housing and a rod fitted therein. A gas chamber and an oil chamber are defined inside the housing. High pressure compressed inactive gas, such as nitrogen, is charged in the gas chamber. The repulsive force of the gas acts as a gas spring mechanism. Damping-force generating means is provided inside the housing. The oil in the oil chamber is subjected to viscous resistance as it passes through the generating means, so that reciprocation of the rod is damped.

A conventional accumulator of this type can have a partition member made of elastomer, which partitions the housing into a gas chamber and an oil chamber. The partition member, which is made of elastomer, allows the passage of a gas from the gas chamber into the oil chamber, though in a small amount. Hence, the pressure of the gas in the gas chamber falls after a long use of the accumulator.

To prevent this fall of gas pressure, it has been proposed that the partition member be replaced by metal bellows which are a more effective gas barrier.

However, since metal has a lower elastic limit than elastomer, the metal bellows will be permanently deformed if a high-pressure gas is charged. Once deformed, the bellows becomes too weak to perform its function or can no longer perform its function.

Hitherto, use has been made of metal bellows whose wall is thick enough to withstand the pressure of the gas being charged into the gas chamber. However, the thicker the bellows, the greater stress the bellows will have when the bellows expands or contracts. To reduce this stress, the bellows must have more convolutions. If the bellows have more convolutions, their axial length will be inevitably long.

SUMMARY OF THE INVENTION

Accordingly, an object of the present invention is to provide an accumulator having a housing and metal bellows partitioning the housing into an oil chamber and a gas chamber, said metal bellows having less convolutions and not deformed excessively when gas is charged into the gas chamber.

The accumulator of the invention is advantageous in that the metal bellows are supported by the back-up oil contained in the oil chamber when a high-pressure gas is charged into the gas chamber, and will not be deformed excessively though its wall is relatively thin.

Briefly, the invention comprises, a cylinder assembly having at least one housing including an oil chamber for containing oil and a gas chamber for containing gas, said gas chamber having a gas supply port;

a metal bellows located between the oil chamber and the gas chamber, said bellows having a fixed end fixed to the housing and a free end, and capable of extending and contracting in the axial direction of the housing;

a stopper having an oil passage port, the stopper is disposed in said oil chamber of the housing;

a self sealing member made of elastomer, the elastomer member is arranged between the free end of the bellows and the stopper, so that the free end of the bellows and the oil passage port is engaged in a liquid-tight manner by means of said elastomer self sealing member, when the bellows expands or contracts to a predetermined length; and a back-up oil chamber defined by inner or outer surface of the bellows, said back-up chamber confining back-up oil when the free end of the bellows and the oil passage port is engaged in a liquid-tight manner.

DETAILED DESCRIPTION OF THE PREFERRED EMBODIMENTS

Figure 1:
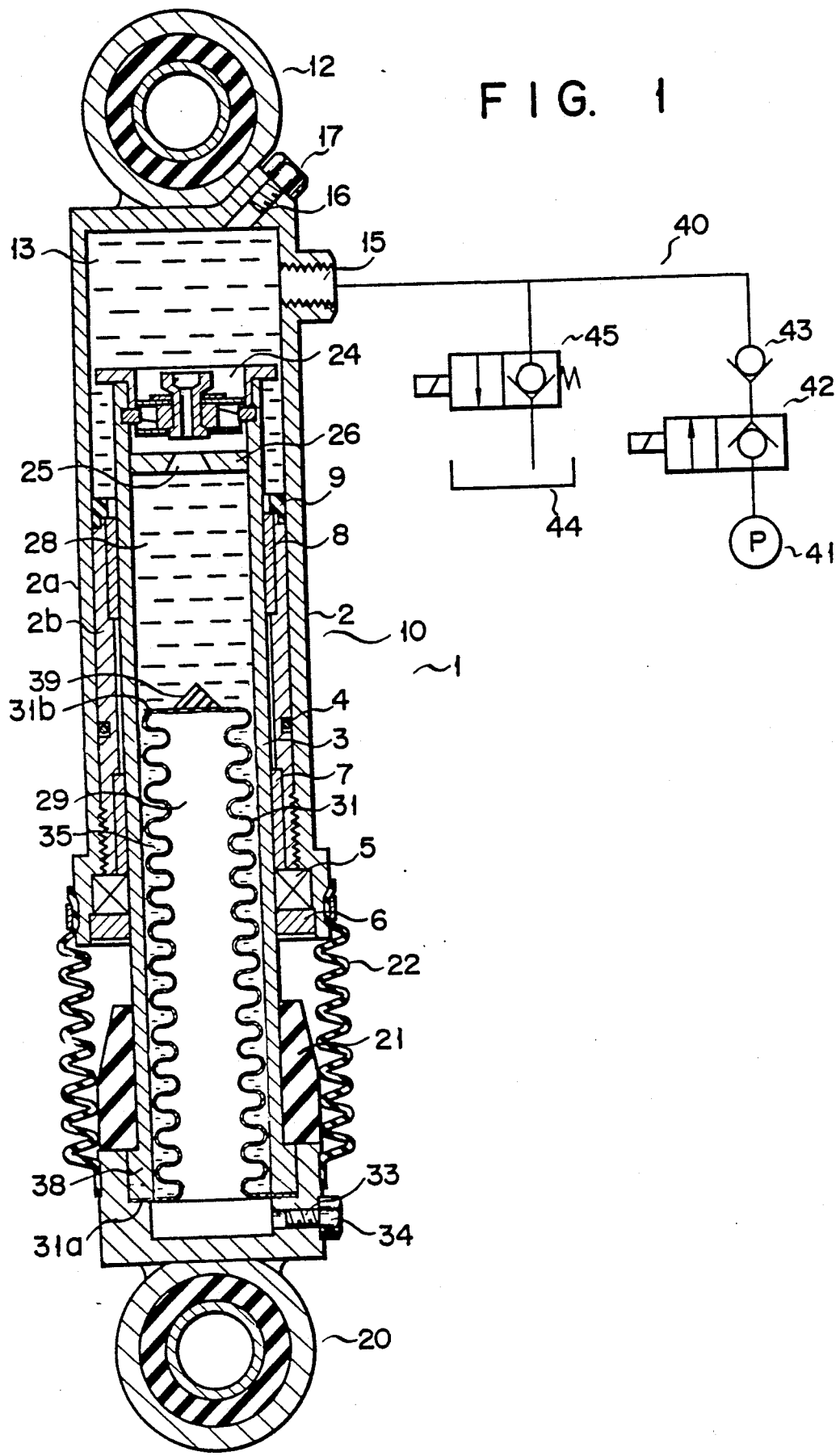
FIG. 1 is a longitudinal, sectional view of an accumulator according to a first embodiment of the present invention.

FIG. 1 shows a first embodiment of the present invention. As is shown in FIG. 1, an accumulator for car suspension system 1 comprises first housing 2 and second housing 3. Second housing 3, having the shape of a hollow cylinder, is fitted in first housing 2, and can reciprocate along the axis of first housing 2.

First housing 2 includes cylindrical first member 2a and cylindrical second member 2b fitted therein. Sealing member 4 is interposed between first and second members 2a and 2b. Oil seal 5, seal retainer 6, and sliding bearing 7 are attached to the lower end portion of second member 2b. Sliding bearing 8 and rebound rubber 9 are attached to the upper end portion of member 2b. First and second housing 2 and 3 constitute cylinder assembly 10.

Coupling member 12 is mounted on the upper end of first housing 2. Housing 2 is connected to a member (not shown) on the car-body, by means of the coupling member. Oil chamber 13 is defined inside housing 2, and it is filled with oil. Oil port 15 in housing 2 connects with chamber 13. Hydraulic unit 40 (mentioned later) is connected to port 15. First housing 2 is formed with hole 16, through which air escapes from oil chamber 13 when oil is injected into chamber 13. Hole 16 is closed by plug 17.

Coupling member 20 and rubber bumper 21 are attached to one end portion of second housing 3. Dust cover 22 is positioned between first housing 2 and the outer end of second housing 3. Cover 22 surrounds a sliding surface of second housing 3 which protrudes from first housing 2. Damping-force generating mechanism 24 is attached to the other end portion of second housing 3, and includes conventional plate valves. Inside housing 3, ring-shaped stopper 26, having oil passage port 25, is fixed in the vicinity of mechanism 24.

Oil chamber 28 and gas chamber 29 are defined inside second housing 3. Chamber 28 communicates with oil chamber 13 of first housing 2 by means of damping-force generating mechanism 24. A compressed inert gas, such as nitrogen, is charged in chamber 29. A pressure of gas is from about 30 to 200 kg/cm$^2$.

Metal bellows 31 is housed in second housing 3, and separates oil chamber 28 and gas chamber 29. In this embodiment, the internal space of bellows 31 serves as gas chamber 29. The gas is charged into chamber 29 through gas-supply port 33. Port 33 is closed by plug 34. Bellows 31 is coaxial with housing 3, and can extend or contract in the axial direction of housing 3. Bellows 31 is made of thin metal plate. A thickness of bellows 31 is, for example, from about 0.1 mm to 0.3 mm. Fixed end 31a of bellows 31 is fixed to end portion of housing 3. Closed free end 31b of bellows 31 is faced to stopper 26. Back-up oil chamber 35 is defined by inner surface of housing 3 and outer surface of bellows 31. Back-up chamber 35 is communicated with oil chamber 28.

Self-sealing member 39 is attached to the outer surface of free end 31b of bellows 31, opposing passage port 25 of stopper 26. A self-sealing member 39 is provided, which is made of elastomer, such as nitrile rubber, and is so shaped (for example, conical) as to fit into port 25 in liquid-tight fashion when bellows 31 expand to a predetermined length. Sealing member 39 has hardness ranging from Hs70 to Hs95 in the definition of the Japanese Industrial Standards, JISK6301.

Figure 2:
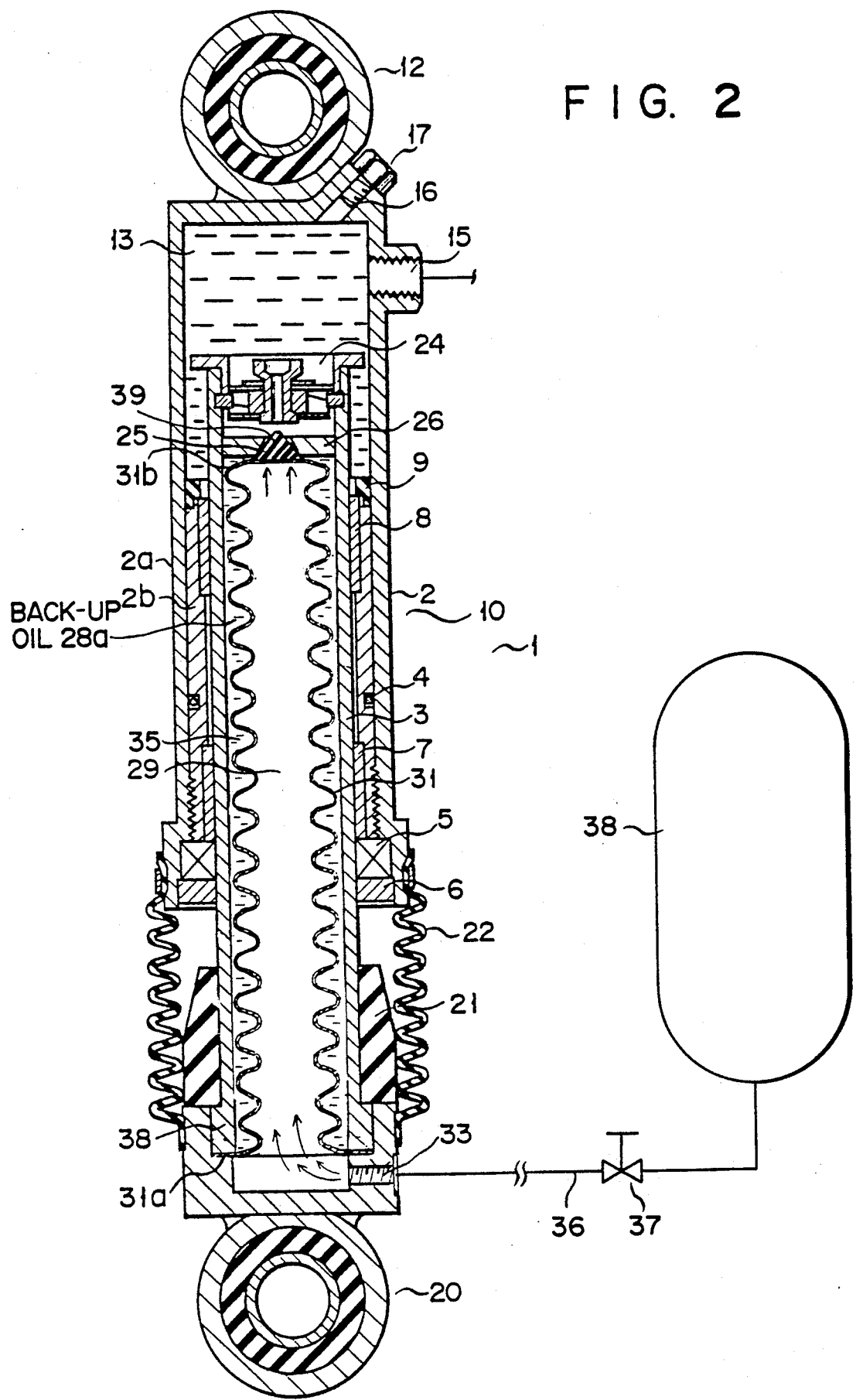
FIG. 2 is a cross-sectional view, illustrating the condition the accumulator assumes when gas is charged into the gas chamber of the accumulator.

A suitable quantity of oil has been stored into oil chamber 28, before the gas is charged into gas chamber 29. As is shown in FIG. 2, to charge the gas into chamber 29, high-pressure gas source 38 is connected to port 33 by pipe 36 and valve 37. When valve 37 is opened, the gas is supplied from source 38 into gas chamber 29. As a result, the gas pressure within chamber 29 rises, whereby bellows 31 expand in the axial direction. As bellows 31 expand, self-sealing member 39 reaches stopper 26 and then fits into port 25. In this condition, back-up oil 28a is confined in back-up oil chamber 35 which is located between the outer periphery of bellows 31 and the inner periphery of second housing 3. Since oil 28a in chamber 35 is practically noncompressive, it evenly supports the outer periphery of bellows 31. Thus, metal bellows 31 are prevented from being deformed excessively or from having a concentrated stress.

Hydraulic unit 40 includes hydraulic source 41 such as oil pump. Arranged between source 41 and oil port 15 are check valve 43 and solenoid-operated valve 42 for supplying oil into oil chamber 13. Solenoid-operated valve 45 for discharging oil from oil chamber 13 is located between oil tank 44 and port 15.

The operation of suspension system 1 will now be described.

If second housing 3 is pushed into first housing 2, some of the oil in oil chamber 13 flows into oil chamber 28 of second housing 3, via damping-force generating mechanism 24. As the oil flows through mechanism 24 in this manner, the motion of second housing 3 is damped by the viscous resistance of the oil. At the same time, the gas in gas chamber 29 is further compressed in accordance with the depth of depression of second housing 3. Accordingly, the capacity of chamber 29 is reduced, so that bellows 31 contracts, and the repulsive force of the gas increases.

If, on the other hand, second housing 3 moves such that it extends out from first housing 2, some of the oil in oil chamber 28 then flows into oil chamber 13 of housing 2, via mechanism 24. Also, as in the previous case, the motion of second housing 3 is damped by the viscous resistance of the oil. In response to the movement of second housing 3, moreover, gas chamber 29 increases in its capacity, so that bellows 31 extends.

Thus, as second housing 3 repeatedly extends and contracts relative to first housing 2, suspension system 1 serves both as a shock absorber and a gas spring. If solenoid-operated valve 42 is opened, with valve 45 closed, the oil from hydraulic source 41 is fed into oil chamber 13. In this case, second housing 3 is moved hydraulically so as to extend out from first housing 2, thereby raising the ride height of the car. Valve 42 is closed and source 41 is stopped, when the height of the car reaches a predetermined value. If, on the other hand, valve 45 is opened, a part of the oil in oil chamber 13 is returned to tank 44. In this case, the ride height of the car decreases.

Figure 3:
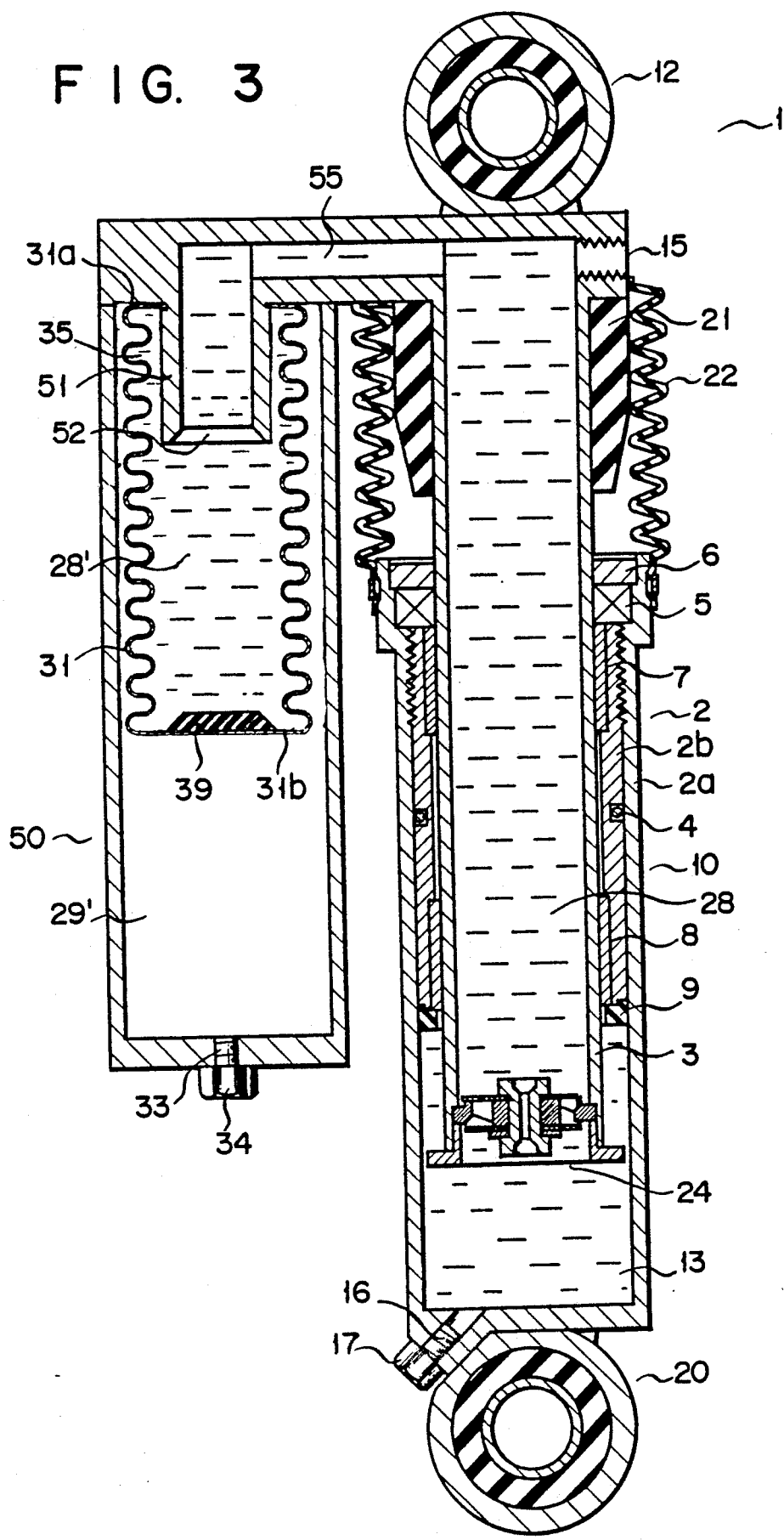
FIG. 3 is a longitudinal, sectional view of an accumulator according to a second embodiment of the present invention.

FIG. 3 shows a second embodiment of the present invention. Suspension system 1 of this embodiment includes third housing 50, in addition to first and second housing 2 and 3.

Oil chamber 28' and gas chamber 29' are arranged in third housing 50. The two chambers are divided by metal bellows 31. Fixed end 31a of bellows 31 is fixed to end portion of housing 50. Chambers 28' and 29' are defined inside and outside bellows 31, respectively. Cylindrical stopper 51, having oil passage port 52, is positioned inside bellows 31. Oil chamber 28' communicates with oil chamber 28 in second housing 3, by means of oil passage 55. Port 15 is connected with hydraulic unit 40 of the same type as is shown in FIG. 1.

Figure 4:
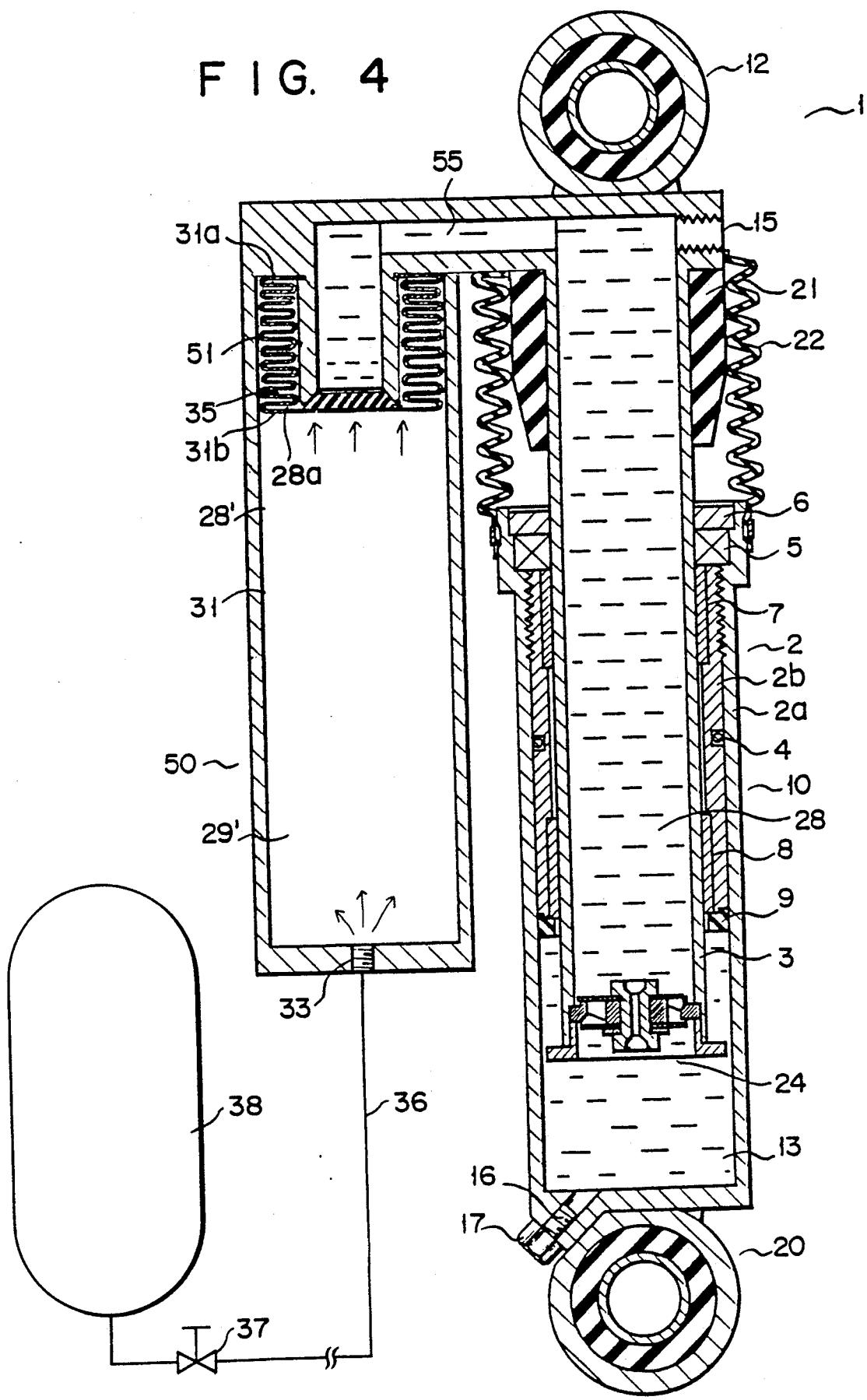
FIG. 4 is a cross-sectional view, illustrating the condition the accumulator shown in FIG. 3 assumes when gas is charged into the gas chamber of the accumulator.

In the second embodiment, self sealing member 39 is attached to the inner surface of the closed free end 31b of bellows 31, facing passage port 52 of stopper 51. Self sealing member 39 is shaped so that it can be fitted in port 52, in a liquid-tight manner. As is shown in FIG. 4, if bellows 31 contracts to a predetermined length when compressed gas is supplied through gas-supply port 33, member 39 engages port 52. Thus, during the charge of the gas, back-up oil 28a is confined in back-up oil chamber 35 which is defined by the inner surface of bellows 31 and the outer surface of stopper 51.

In the second embodiment, when second housing 3 reciprocates in the axial direction, relative to first housing 2, oil in oil chamber 28 inside second housing 3 flows, through oil passage 55, into or out of oil chamber 28' inside third housing 50. As second housing 3 reciprocates, moreover, some of the oil flows through damping-force generating mechanism 24, thereby changing the capacity of gas chamber 29'. Accordingly, bellows 31 extends and contracts in the axial direction.

Figure 5:
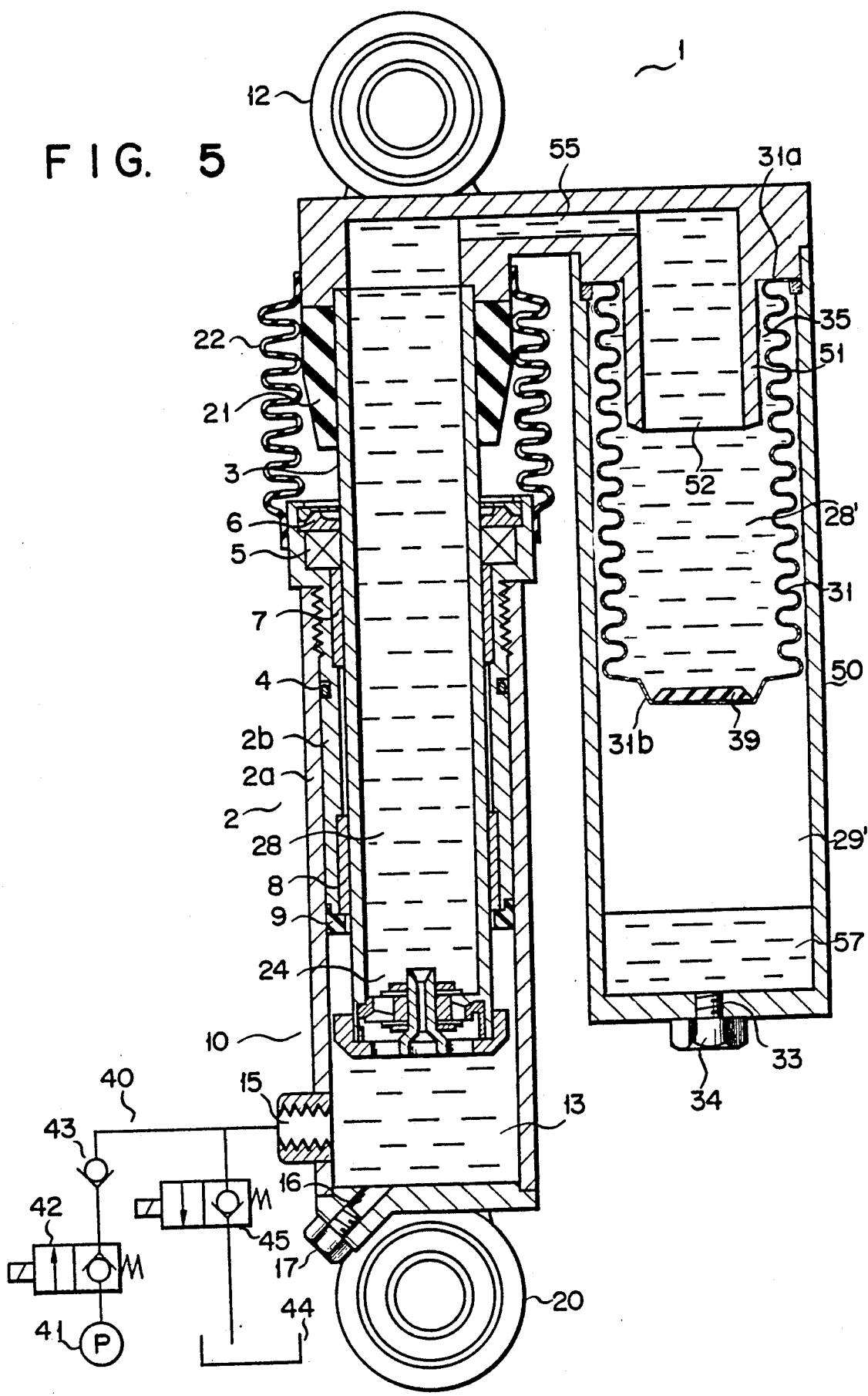
FIG. 5 is a longitudinal, sectional view of an accumulator according to a third embodiment of this invention.

FIG. 5 shows a third embodiment of the present invention. In this embodiment, a suitable quantity of liquid 57 is contained in gas chamber 29', whereby the capacity of chamber 29' is adjusted.

What is claimed is:

1. An accumulator comprising:
   a cylinder assembly having at least one housing including an oil chamber for containing oil and a gas chamber for containing gas, said gas chamber having a gas supply port;
   a metal bellows located between the oil chamber and the gas chamber, said bellows having a fixed end fixed to the housing and free end, and capable of extending and contracting in the axial direction of the housing, said oil chamber defined inside the bellows and said gas chamber defined outside the bellows;
   a cylindrical stopper having an oil passage port, the stopper is disposed in said oil chamber of the housing;
   a self sealing member made of elastomer, the elastomer member is attached to inside the free end of the bellows and facing the passage port of the stopper, so that the self sealing member is fitted in the passage port, in a liquid-tight manner, when the bellows contracts to a predetermined length; and
   a back-up oil chamber defined between inner surface of the bellows and outer surface of the cylindrical stopper, said back-up chamber confining back-up oil when the self sealing member is fitted in the passage port of the stopper.

* * * * *

UNITED STATES PATENT AND TRADEMARK OFFICE
CERTIFICATE OF CORRECTION

PATENT NO. : 5,042,781

DATED : August 27, 1991

INVENTOR(S) : EZURE et al

It is certified that error appears in the above-identified patent and that said Letters Patent is hereby corrected as shown below:

Title page, under Section [30] Foreign Application Priority Data:

Change the first Japanese Application

No. "61-18184" to --61-18184[U]--.

Signed and Sealed this

Sixteenth Day of March, 1993

Attest:

STEPHEN G. KUNIN

*Attesting Officer*     *Acting Commissioner of Patents and Trademarks*